United States Patent [19]

Thevissen

[11] Patent Number: 5,627,145
[45] Date of Patent: May 6, 1997

[54] COMPOSITION AND METHOD FOR CONTROLLING PHOSPHONATES TENDING TO PRECIPITATE METAL IONS IN WATER

[75] Inventor: Peter K. L. G. Thevissen, Herent, Belgium

[73] Assignee: BetzDearborn Inc., Trevose, Pa.

[21] Appl. No.: 446,134

[22] Filed: May 25, 1995

Related U.S. Application Data

[63] Continuation of Ser. No. 301,161, Sep. 6, 1994, Pat. No. 5,453,416, which is a continuation of Ser. No. 868,079, Apr. 13, 1992, abandoned, Continuation-in-part of Ser. No. 701, 301, May 13, 1991, abandoned, which is a continuation of Ser. No. 372,121, Jun. 27, 1989, abandoned, which is a continuation-in-part of Ser. No. 78,799, Jul. 28, 1987, abandoned.

[30] Foreign Application Priority Data

Jul. 30, 1986 [EP] European Pat. Off. .............. 86201341

[51] Int. Cl.$^6$ .................................. C09K 7/00; C02F 5/10
[52] U.S. Cl. .................. 507/224; 252/180; 210/642; 210/701; 526/287
[58] Field of Search .................. 252/180; 210/642, 210/701; 526/287

[56] References Cited

U.S. PATENT DOCUMENTS

| | | |
|---|---|---|
| 3,806,367 | 4/1974 | Lange et al. . |
| 3,839,393 | 10/1974 | Steckler ...................... 252/8.75 X |
| 3,904,522 | 9/1975 | Greenfield . |
| 3,928,196 | 12/1975 | Persinski et al. . |
| 4,036,788 | 7/1977 | Steckler ...................... 526/287 X |
| 4,071,508 | 1/1978 | Steckler ...................... 210/681 X |
| 4,288,327 | 8/1981 | Godlewski et al. . |
| 4,659,482 | 4/1987 | Chen ............................ 210/701 X |
| 4,836,933 | 6/1989 | Montague et al. ............ 210/701 |
| 5,453,416 | 9/1995 | Thevissen ...................... 507/224 |

FOREIGN PATENT DOCUMENTS

| | | |
|---|---|---|
| 0017373 | 10/1980 | European Pat. Off. . |
| 0122013 | 10/1984 | European Pat. Off. . |
| 0142929 | 5/1985 | European Pat. Off. . |

*Primary Examiner*—Sharon Gibson
*Assistant Examiner*—Valerie Fee
*Attorney, Agent, or Firm*—Alexander D. Ricci; Steven D. Boyd

[57] ABSTRACT

A method for controlling phosphonates which tend to precipitate with metal ions in water treatment operations comprising, adding to the water a water-soluble copolymer containing one or more of the following monomeric units:

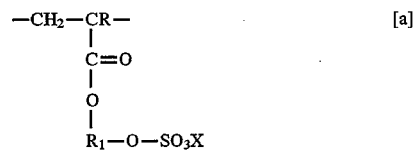

[a]

in which: R is hydrogen or an alkyl group, $R_1$ is an alkyl group and X is hydrogen, $NH_4^+$, a water soluble metal ion or organic base; and

[b] a monocarboxylic acid monomer; and adding the copolymer to the water to be treated in an amount sufficient to prevent precipitation of said phosphonates.

10 Claims, 1 Drawing Sheet

STABILIZATION OF PHOSPHONATES BY APPLICATION OF HEMA-S-AA COPOLYMER

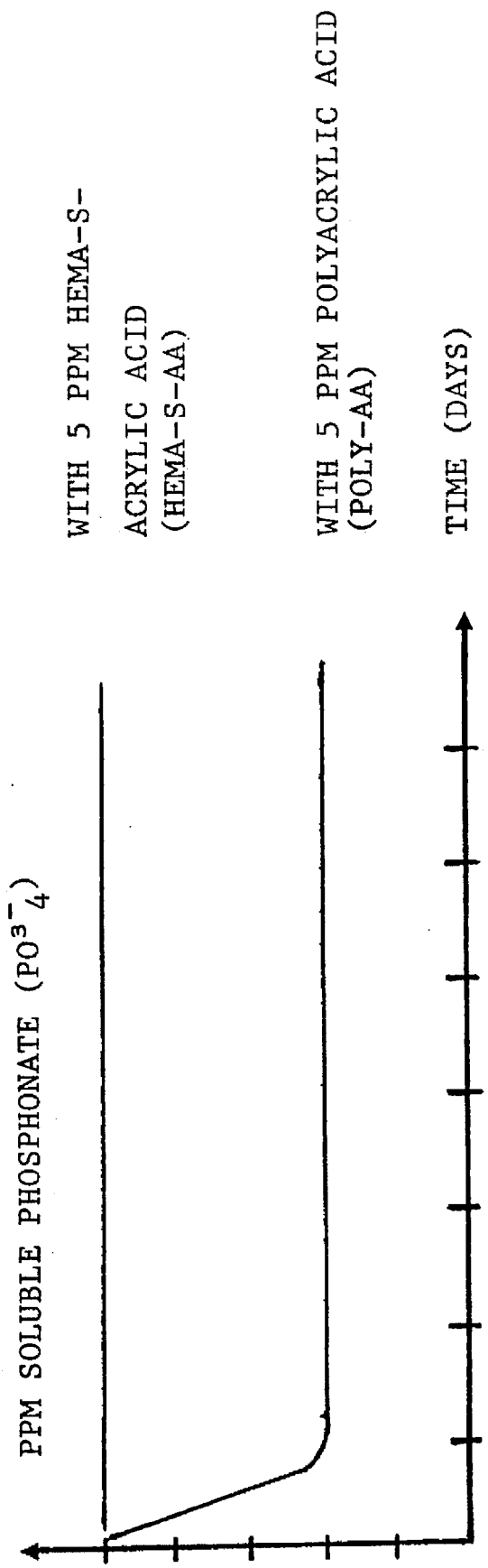
FIGURE I
STABILIZATION OF PHOSPHONATES BY APPLICATION OF HEMA-S-AA COPOLYMER

COMPOSITION AND METHOD FOR CONTROLLING PHOSPHONATES TENDING TO PRECIPITATE METAL IONS IN WATER

CROSS REFERENCE TO RELATED APPLICATIONS

This is a continuation of application Ser. No. 08/301,161, filed Sep. 6, 1994 U.S. Pat. No. 5,453,416; which is a Continuation of U.S. Ser. No, 07/868,079, filed Apr. 13, 1992; which is a Continuation-in-Part of U.S. Ser. No. 07/701,301, filed May 13, 1991; which is a Continuation of U.S. Ser. No. 07/372,121, filed Jun. 27, 1989; which is a Continuation-in-Part of U.S. Ser. No. 07/078,799, filed Jul. 28, 1987 which all abandoned.

FIELD OF THE INVENTION

This invention relates to a composition and method for controlling phosphonates which normally tend to precipitate with metal ions such as calcium and zinc in water treatment systems.

BACKGROUND OF THE INVENTION

Natural water typically contains many salts which form ions in solution. All these ions are involved in chemical equilibria. The solubility of the different chemical species is described by the solubility product. If the solubility product of a chemical species is exceeded, solid products can precipitate out of solution and produce deposits on surfaces in contact with the aqueous solution. These deposits can give rise to severe problems in industrial aqueous equipment such as heat exchangers in cooling systems, boilers, evaporators, etc. The most common deposits which form on aqueous equipment surfaces are calcium carbonate, calcium sulfate, calcium phosphate, zinc hydroxide, zinc phosphate, silicates and iron oxides.

To overcome these problems, deposit control chemicals such as phosphonates and polymers have been used to treat these systems. At very low (substoichiometric) treatment levels, these deposit control chemicals inhibit the nucleation and growth of crystals.

For example, U.S. Pat. Nos. 3,904,522 and 3,928,196 describe the use of polyacrylic acid and hydrolyzed polyacrylamide as scale inhibitors for $CaCO_3$ and $CaSO_4$. U.S. Pat. No. 3,928,196 describes the use of acrylic acid-2-acrylamido-2-methylpropylsulfonic acid (AMPS) copolymer as an antiprecipitant for calcium carbonate and calcium sulfate. U.S. Pat. No. 3,806,367 teaches the use of acrylic acid-AMPS copolymers in preventing and removing iron oxide deposits.

Prior to about 1980, there were no commercially available polymers or phosphonates which could prevent calcium phosphate, zinc hydroxide and zinc phosphate deposit formation. The copolymer acrylic acid-hydroxy-propylacrylate was first described as preventing these deposits (European Patent Application 0 017 373). Since 1980 many other polymers have been developed which are also able to prevent zinc hydroxide, zinc phosphate and calcium phosphate deposits. For example, European Patent Application 0 142 929 and U.S. Pat. No. 4,288,327 describe the use of acrylic acid-sulfonate ether copolymers as phosphate antiprecipitants.

The most widespread phosphonates are hydroxyethylidene phosphonic acid and nitrilotrimethylenephosphonic acid. Phosphonates are also used as corrosion inhibitors. However, the use of phosphonates as scale and corrosion inhibitors in water treatment has left some important problems. As is known from the literature, many of the commonly used phosphonates form insoluble phosphonate salts with cations, such as, for example, calcium and zinc.

Until now only sulfonate containing polymers were known to prevent calcium and zinc phosphonate deposits. For example, European Patent Application 0 142 929 and European Patent Application 0 122 013 describe the use of sulfonate containing polymers for this purpose.

Now, surprisingly, it has been found that sulfate containing polymers also exhibit zinc and calcium phosphonate stabilizing properties. Sulfate containing polymers have been known for a number of years. For example, U.S. Pat. No. 3,839,393 describes the synthesis and polymerization of sulfatoalkane acrylates and methacrylates. U.S. Pat. No. 4,036,788 describes anionic hydrogels based on sulfate containing monomers. However, in the literature phosphonate stabilizing properties of sulfate containing polymers have never been described, suggested or recognized. While U.S. Pat. No. 4,036,788 to Steckler is involved with the complexation of basic cationic materials onto anionic hydrogels which are stable, three dimensional, water-insoluble copolymer networks, the present invention is directed to water treatment with substoechiometric amounts of the water-soluble polymers disclosed.

BRIEF DESCRIPTION OF THE DRAWING

FIG. 1 illustrates the enhanced solubility of phosphonates ($PO_4^{3-}$) in an aqueous solution treated with the polymer of the invention relative to an aqueous solution treated with a polyacrylic acid polymer.

SUMMARY OF THE INVENTION

One object of the invention is to provide a new and original method for controlling such phosphonates in water treatment.

In accordance with the present invention, there has been provided a method for treating an aqueous system containing metal ions to inhibit or prevent the precipitation of phosphonates with the metal ions which comprises adding to the system a water-soluble copolymer containing at least the following monomeric units:

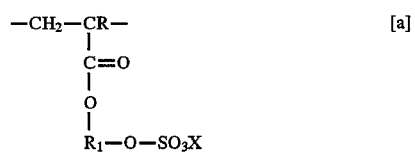

[a]

where R is hydrogen or alkyl; $R_1$ is an alkyl group and X is hydrogen, $NH^+_4$, a water soluble metal ion or an organic base; and

[b] a monocarboxylic acid monomer.

The preferred monocarboxylic acid is acrylic acid or methacrylic acid.

Other features and advantages of the invention will appear from the detailed description set forth hereinafter.

It has been discovered that when adding to a water solution a new polymer according to the invention in combination with phosphonates which normally tend to precipitate out in high calcium containing water, essentially no precipitation of insoluble phosphonate compounds will occur. In addition the protection against corrosion will be remarkably improved.

DESCRIPTION OF THE PREFERRED EMBODIMENT

The present invention is directed to a method for treating an aqueous system containing metal ions to inhibit or prevent the precipitation of phosphonates with the metal ions which comprises adding to the system a water-soluble polymer containing at least the following monomers;

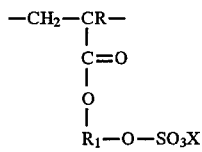

[a]

where R is hydrogen or alkyl; $R_1$ is an alkyl group and X is hydrogen $NH^+_4$, a water soluble metal ion or an organic base. An example of this type of monomer is the sulfuric ester of 2-hydroxyethylmethacrylate (HEMA);

[b] Monocarboxylic acid monomers, such as acrylic acid or methacrylic acid. These acids may be neutralized to the salt form with bases such as, for example, sodium hydroxide, ammonia, and organic bases as, for example, ethanolamine.

Also part of these carboxylic acids may be replaced by other monomer units, such as:

dicarboxylic acids such as maleic acid or anhydride, itaconic acid and the like;

sulfonate containing monomers such as 2-acrylamido-2-methylpropylsulfonic acid, methallylsulfonic acid, vinylsulfonic acid and the like;

hydroxy-containing monomers such as 2-hydroxypropylacrylate allyl-alcohol and the like;

esters of the aforementioned monomers, for example, ethylacrylate, methylmethacrylate, the phosphate ester of hydroxyethylmethacrylate;

phosphorus bearing monomers like vinylphosphonic acid, allylhydroxypropylphosphonate, etc.; and other copolymerizable units which include acrylamide, acrylonitrile, vinylacetate, acroleine, or cationic monomers, and mixtures thereof.

The polymers may be produced, for example, by simple polymerization techniques involving free radicals with water as a solvent, as are well known to those of skill in this art. Common chemicals such as persulfate, hydrogen peroxide and benzoylperoxide may be used as initiators. To regulate the chain length, well known materials such as sulfur bearing compounds, e.g. mercaptoacetic acid, mercaptoethanol and so forth may be used. Other chain transfer agents are, for example, phosphorus bearing compounds such as $H_2PO_3$, $H_3PO_2$ and organic phosphorus bearing compounds such as, for example, dialkylphosphite. Also, alcohols, for instance, isopropanol may be used.

The molecular weight of the polymer may vary between about 500 to about 100,000, with about 1000 to 10,000 being preferred. The ratio of [a] to [b] monomers, as referred to above, may vary from 30:1 to 1:30. The range of preferred ratios is 1:30 to 1:2.

The above described polymers are added to the aqueous system in amounts that are substoichiometric with respect to the metal ions which are present in the system and generally demonstrate their phosphonate stabilizing properties in the dose range of about 0.1 to 100 ppm; 1 to 20 ppm being preferred.

To control phosphonate deposits the aforementioned polymers may be combined with other polymers. Examples of such polymers are:

polymonocarboxylic acid, e.g. polyacrylic acid, phosphinocarboxylic acids;

polydicarboxylic acids, e.g. polymaleic acid;

polyacrylamide copolymers of monocarboxylic or dicarboxylic acids with other copolymerizable units, such as:

sulfonate containing monomers, as for example, 2-acrylamido-2-methyl-propylsulfonic acid, methallylsulfonic acid, styrene sulfonic acid;

hydroxy-containing monomers, such as 2-hydroxypropyl-acrylate, allyl-alcohol;

esters of the aforementioned carboxylic acids, such as ethylacrylate, methylmethacrylate etc.

aldehyde containing monomers, e.g. acroleine;

amides, e.g. acrylamide; and phosphorus bearing monomers, such as vinylphosphonate, allylhydroxypropylphosphonate, hydroxyethylmethacrylate phosphate.

Also included within the intended copolymers are the copolymers bearing phosphine groups as mentioned in European Patent Application 0 150 706, and polysulfonic acids, such as polystyrenesulfonate.

This above listing of admixed polymers merely serves as an illustration and is not intended to be a limitation on the scope of the present invention.

In addition to the above set forth compositions and solutions, use can be made of other water treating chemicals such as:

zinc, inorganic phosphorus compounds such as orthophosphate polyphosphates, organic phosphates which stay in solution at high calcium levels;

iron complexing agents such as citric acid, gluconic acid;

passive film forming agents such as mono or polycarboxylic long aliphatic chain or cycloaliphatic di- and polycarboxylic acids;

copper protecting chemicals such as benzotriazole, mercaptobenzothiazole, tolyltriazole; and silicates.

Water to be treated according to the invention may include cooling water, boiler water, water in water scrubber units, and so on.

EXAMPLES

The following examples illustrate the merits of the invention. In these examples use is made of the code set forth below:

| Polymer | Code |
| --- | --- |
| Polyacrylic Acid | 1 |
| Copolymer sulfuric ester of hydroxyethylene-methacrylic acid (HEMA-S)35%-Acrylic acid (AA)65% | 2 |
| Terpolymer HEMA-S(30%)-AA(60%)-maleic acid | 3 |
| Terpolymer HEMA-S(30%)-AA(60%)-Hydroxypropyl-acrylate(10%) | 4 |
| Terpolymer HEMA-S(20%)-AMPS(15%)-AA(65%) | 5 |
| HEMA-S(35%)-AA(60%)-allylalcohol(10%) | 6 |
| HEMA-S(30%)-AA(60%)-acrylamide(10%) | 7 |
| HEMA-S(30%)-AA(60%)-allyhydroxypropyl-phosphonate(10%) | 8 |

Example 1

A 10 ppm solution of different well known phosphonates was brought into contact with a 1000 ppm solution of Calcium at a temperature of about 60° C. for about 30 minutes, at pH 9, and then mixed together with a polymer. After a period the turbidity of the sample was measured at 450 nm. The sample was then filtered over a millipore filter of 0.22 um and the soluble phosphonate was determined. The results are shown below in Table 1.

TABLE 1

Stabilization of Different Phosphates at pH 9; Turbidity of Calcium Measured; 1000 ppm CaCO₃

| Phosphonate | Additive | Turbidity at 450 nm | Soluble Phosphonate (ppm as $PO_4^{3-}$) |
|---|---|---|---|
| 10 ppm nitrilotrimethylene phosphonic acid (NTMPA) | none | 0.019 | 3.82 |
| 10 ppm nitrilotrimethylene phosphonic acid (NTMPA) | 10 ppm 1 | 0.017 | 4 |
| 10 ppm hydroxyethylidene-diphosphonic acid (HEDP) | none | 0.020 | 3.6 |
| 10 ppm hydroxyethylidene-diphosphonic acid (HEDP) | 10 ppm copolymer 2 | 0.002 | 8.2 |
| 10 ppm hydroxyethylidene-diphosphonic acid (HEDP) | 10 ppm 1 | 0.018 | 3.9 |
| 5 ppm HEDP-5 ppm NTMPA | none | 0.019 | 4.01 |
| 5 ppm HEDP-5 ppm NTMPA | 10 ppm copolymer 2 | 0.002 | 9.04 |
| 5 ppm HEDP-5 ppm NTMPA | 10 ppm copolymer 2 | 0.017 | 4.4 |
| 10 ppm NTMPA | 10 ppm terpolymer 3 | 0.005 | 7.2 |
| 10 ppm HEDP | 10 ppm terpolymer 3 | 0.006 | 6.9 |
| 10 ppm NTMPA | 10 ppm terpolymer 4 | 0.006 | 7.1 |
| 10 ppm HEDP | 10 ppm terpolymer 4 | 0.006 | 6.8 |
| 10 ppm NTMPA | 10 ppm terpolymer 5 | 0.004 | 7.9 |
| 10 ppm HEDP | 10 ppm terpolymer 5 | 0.003 | 8.0 |
| 10 ppm NTMPA | 10 ppm terpolymer 6 | 0.005 | 7.3 |
| 10 ppm HEDP | 10 ppm terpolymer 6 | 0.005 | 7.4 |
| 10 ppm NTMPA | 10 ppm terpolymer 7 | 0.005 | 7.2 |
| 10 ppm HEDP | 10 ppm terpolymer 7 | 0.005 | 7.3 |
| 10 ppm NTMPA | 10 ppm | 0.005 | 7.4 |
| 10 ppm NTMPA | 10 ppm terpolymer 8 | 0.005 | 7.4 |
| 10 ppm HEDP | 10 ppm terpolymer 8 | 0.006 | 7.0 |

Example 2

The same effects are observed when adding at pH 9 a supplement of zinc ions to the solution. This is demonstrated in the next table, where a supplement of 2 ppm zinc is added to the solution.

TABLE 2

Stabilization of Various Solutions 1 with Addition of 2 ppm Zinc

| Phosphonate | Additive | Turbidity | Soluble phosphonate (ppm as $PO_4^{3-}$) | Soluble Zinc (ppm Zn) |
|---|---|---|---|---|
| 10 ppm NTMPA | none | 0.005 | 8.72 | 0.58 |
| 10 ppm HEDP | none | 0.020 | 2.20 | 0.34 |
| 5 ppm HEDP-5 ppm NTMPA | none | 0.020 | 5.88 | 0.78 |
| 10 ppm NTMPA | 5 ppm copolymer 2 | 0.002 | 9.6 | 0.75 |

TABLE 2-continued

Stabilization of Various Solutions 1 with Addition of 2 ppm Zinc

| Phosphonate | Additive | Turbidity | Soluble phosphonate (ppm as $PO_4^{3-}$) | Soluble Zinc (ppm Zn) |
|---|---|---|---|---|
| 10 ppm HEDP | 5 ppm copolymer 2 | 0.010 | 3.22 | 0.69 |
| 5 ppm HEDP-5 ppm NTMPA | 5 ppm copolymer 2 | 0.003 | 8.5 | 1.16 |
| 10 ppm NTMPA | 10 ppm copolymer 2 | 0.002 | 8.80 | 0.56 |
| 10 ppm HEDP | 10 ppm copolymer 2 | 0.002 | 7.76 | 1.60 |
| 5 ppm HEDP-5 ppm NTMPA | 10 ppm Sopolymer 2 | 0.002 | 8.17 | 1.38 |
| 10 ppm NTMPA | 10 ppm terpolymer 3 | 0.0005 | 7.4 | 1.20 |
| 10 ppm HEDP | 10 ppm terpolymer 3 | 0.006 | 7.1 | 1.10 |
| 10 ppm HEDP | 10 ppm terpolymer 5 | 0.006 | 6.9 | 1.05 |
| 10 ppm NTMPA | 10 ppm terpolymer 5 | 0.002 | 8.5 | 1.42 |
| 10 ppm HEDP | 10 ppm terpolymer 6 | 0.003 | 8.4 | 1.39 |
| 10 ppm NTMPA | 10 ppm terpolymer 6 | 0.005 | 7.4 | 1.03 |
| 10 ppm HEDP | 10 ppm terpolymer 7 | 0.006 | 7.3 | 1.10 |
| 10 ppm NTMPA | 10 ppm terpolymer 7 | 0.005 | 7.5 | 1.20 |
| 10 ppm HEDP | 10 ppm terpolymer 8 | 0.006 | 7.1 | 1.13 |
| 10 ppm NTMPA | 10 ppm terpolymer 8 | 0.005 | 7.5 | 1.23 |
| 10 ppm HEDP | 10 ppm terpolymer 8 | 0.005 | 7.6 | 1.28 |

Example 3

The HEMA-S-acrylic acid copolymer was also tested in a pilot cooling system under an all organic program containing 3 ppm NTMPA, 2 ppm HEDP, 2 ppm phosphonobutane-1,2,4-tricarboxylic acid (PBTC). The water quality of the cooling water is indicated below:

| | |
|---|---|
| pH: | 8.6 |
| TAC (ppm $CaCO_3$): | 500 |
| TA (ppm $CaCO_3$): | 30 |
| Cl: | 260 ppm |
| $SO_4^{2-}$: | 240 ppm |
| TDS: | 1500 μS cm$^{-1}$ |
| TCa (ppm $CaCO_3$): | 500 |

The water temperature of the cooling water was about 50° C.; the retention time of the cooling system was 3 days.

When using 5 ppm HEMA-S-acrylic acid copolymer as a polymer constituent, no phosphonate loss was observed during 7 days, while corrosion was completely under control.

Substituting the HEMA-S-acrylic acid copolymer for simple polyacrylic acid, the soluble phosphonate content dropped fast, heavy calcium phosphonate deposits resulted and under the deposit corrosion took place. The difference in phosphonate solubility between the two treatments is given in the Figure.

I claim:

1. A composition of matter, comprising; a water soluble copolymer having a molecular weight from about 500 to about 100,000 containing the following monomeric units (a) and b):

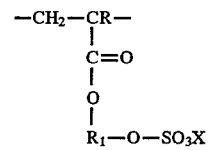

in which:

R is hydrogen, or an alkyl group, $R_1$ is an alkylene group and

X is hydrogen, $NH^+_4$, a water soluble metal ion or an organic base; and (b) a monocarboxylic acid monomer selected from the group consisting of acrylic acid and methacrylic acid.

2. The composition of claim 1, wherein the monomer unit is the sulfuric ester of 2-hydroxyethylmethacrylate.

3. The composition of claim 1, wherein the carboxylic acid is neutralized by an inorganic or organic base.

4. The composition of claim 1, wherein the monomeric unit referred to in is a mixture of sulfate containing monomers.

5. The composition of claim 1, wherein the molar ratio between the monomers referred to in and varies between 30:1 to 1:30.

6. The composition of claim 5, wherein the molar ratio varies between 30:0 and 1:2.

7. The composition of claim 1, wherein said copolymer is in an aqueous solution in a concentration of about 0.1 ppm to 100 ppm.

8. The composition of claim 7, wherein said copolymer is in a concentration of about 1 to about 20 ppm.

9. A composition of matter, comprising:

an aqueous phosphonate containing solution of a copolymer having a molecular weight from about 500 to about 100,000 wherein the concentration of the copolymer in the solution is within the range 0.1 to 100 ppm and wherein the copolymer contains the following monomeric units (a) and (b):

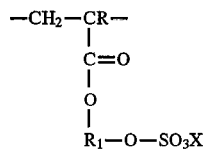

in which:

R is hydrogen, or an alkyl group, $R_1$ is an alkylene group and

X is hydrogen, $NH^+_4$, a water soluble metal ion or an organic base; and (b) a monocarboxylic acid monomer selected from the group consisting of acrylic acid and methacrylic acid.

10. A composition of claim 9 wherein the concentration of the copolymer is within the range 1 to 20 ppm.

* * * * *